United States Patent
Yon et al.

(10) Patent No.: US 10,150,355 B2
(45) Date of Patent: Dec. 11, 2018

(54) SELF-ADJUSTING SPACER DEVICE

(71) Applicant: ILLINOIS TOOL WORKS INC., Glenview, IL (US)

(72) Inventors: Fulvio Pacifico Yon, Donnas (IT); Andrea Coccoz, Ivrea (IT)

(73) Assignee: ILLINOIS TOOL WORKS INC., Glenview, IL (US)

(*) Notice: Subject to any disclaimer, the term of this patent is extended or adjusted under 35 U.S.C. 154(b) by 180 days.

(21) Appl. No.: 15/102,927

(22) PCT Filed: Oct. 7, 2014

(86) PCT No.: PCT/US2014/059391
§ 371 (c)(1),
(2) Date: Jun. 9, 2016

(87) PCT Pub. No.: WO2015/094457
PCT Pub. Date: Jun. 25, 2015

(65) Prior Publication Data
US 2016/0303960 A1     Oct. 20, 2016

(30) Foreign Application Priority Data

Dec. 16, 2013   (IT) .............................. TO2013A1025

(51) Int. Cl.
*E05F 5/02*     (2006.01)
*B60J 10/50*    (2016.01)
(Continued)

(52) U.S. Cl.
CPC .............. *B60J 10/50* (2016.02); *B60J 10/45* (2016.02); *E05F 5/022* (2013.01); *F16B 33/004* (2013.01);
(Continued)

(58) Field of Classification Search
CPC  F16B 37/0807; F16B 37/085; F16B 37/0864; F16B 21/04; E05F 5/022
(Continued)

(56) References Cited

U.S. PATENT DOCUMENTS 2,374,690 A * 5/1945 Laue ......................... F16K 1/02
                                                251/227
3,842,877 A * 10/1974 Andrews ............... F16B 37/085
                                                411/259

(Continued)

OTHER PUBLICATIONS

Translation of DE 198 55 949 C1, Bayerische Motoren Werke AG, Jul. 13, 2000.*

*Primary Examiner* — Flemming Saether
(74) *Attorney, Agent, or Firm* — Pilloff & Passino LLP; Martin J. Cosenza

(57) ABSTRACT

Self-adjusting spacer device, including a bushing having a cavity with a longitudinal axis, a pin having a shank inserted into said cavity and a head projecting outside of said cavity, the cavity of the bushing and the pin being provided with respective threaded portions that do not extend over the entire circumference of the pin and the cavity, and the pin being rotatable relative to the bushing between (i) an adjustment position in which the threaded portion of the pin is disengaged from the threaded portion of the bushing and the pin is capable of moving axially with respect to the bushing, and (ii) a locking position in which the threaded portion of the pin engages the threaded portion of the bushing and in which the pin is locked axially with respect to the bushing.

8 Claims, 7 Drawing Sheets

(51) Int. Cl.
*B60J 10/00* (2016.01)
*F16B 33/00* (2006.01)
F15B 21/04 (2006.01)
F16B 37/08 (2006.01)

(52) U.S. Cl.
CPC ....... *E05Y 2600/61* (2013.01); *E05Y 2800/12* (2013.01); *F15B 21/04* (2013.01); *F16B 37/085* (2013.01)

(58) Field of Classification Search
USPC .......... 411/418, 437, 551, 554; 16/82, 86 R, 16/86 A
See application file for complete search history.

(56) References Cited

U.S. PATENT DOCUMENTS

| | | | | |
|---|---|---|---|---|
| 4,619,569 | A * | 10/1986 | Wright | F16B 37/085 411/347 |
| 6,119,306 | A * | 9/2000 | Antonucci | E05F 5/022 16/86 A |
| 7,293,936 | B1 * | 11/2007 | Warren | F16B 37/085 124/23.1 |
| 7,356,879 | B2 * | 4/2008 | Dembowsky | F16B 5/0233 16/82 |
| 8,382,415 | B1 * | 2/2013 | Goldbaum | F16B 39/122 411/366.1 |
| 8,979,417 | B2 * | 3/2015 | Wandelt | F16B 5/025 403/350 |
| 9,580,951 | B2 * | 2/2017 | Duprez | E05F 5/022 |

\* cited by examiner

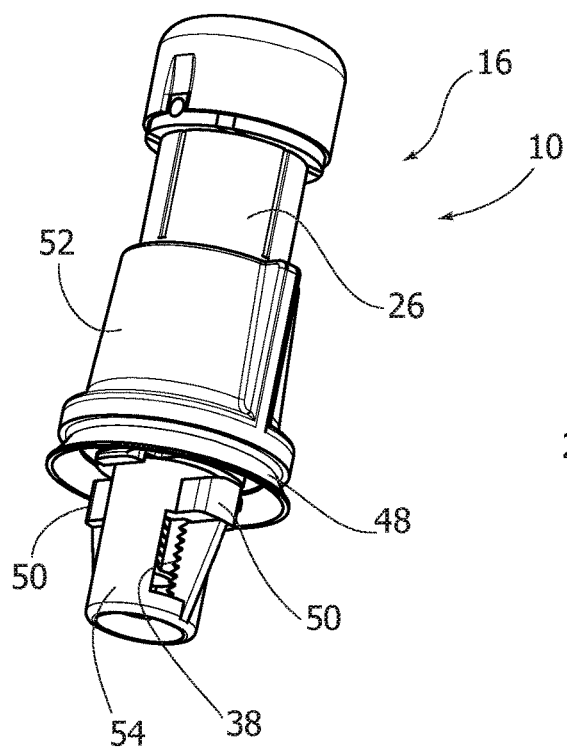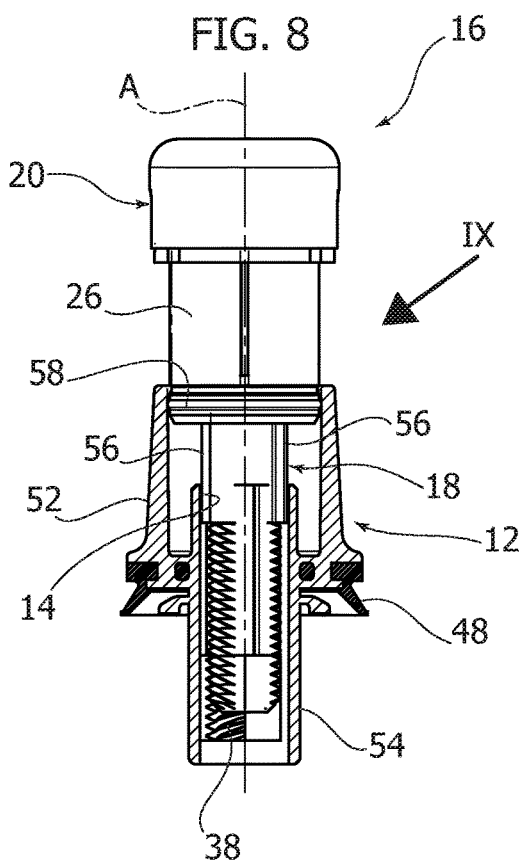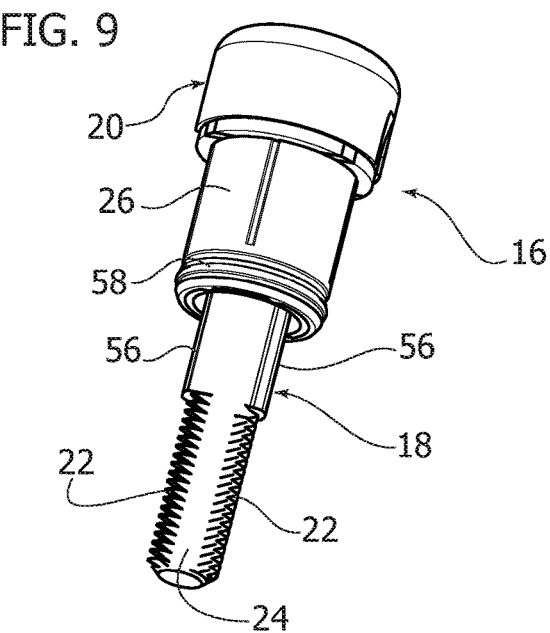

SELF-ADJUSTING SPACER DEVICE

RELATED APPLICATIONS

The present application is a National Phase of International Application Number PCT/US2014/059391, filed Oct. 7, 2014, and claims priority to Italian Application Number TO2013A001025, filed Dec. 16, 2013.

FIELD OF THE INVENTION

The present invention relates to a self-adjusting spacer device for keeping two structural parts in a spaced relationship with respect to each other.

The spacer device according to the present invention has been developed in particular with a view to application in the automobile sector. In particular, adjustable spacer devices are used to withstand and reduce the vibrations of parts which may be opened, such as the hood of the engine compartment or the trunk door.

The spacer devices have the function of supporting the movable structural part (for example the hood or trunk door of a vehicle) in a position flush with the stationary structural part (for example the body of a vehicle). The relative distance between the two structural parts may vary for example owing to the manufacturing and assembly tolerances. There is therefore the need to have adjustable spacer devices which allow compensation of the manufacturing and assembly tolerances between two structural parts.

PRIOR ART

FR 2,886,329 describes a self-adjusting spacer comprising a bushing having a cavity provided with retaining grooves, a sleeve provided with flexible fingers and with retaining grooves on the outer surfaces of the flexible fingers and a locking element rotatable with respect to the sleeve between an disengaged position and an engaged position. When the locking element is in the disengaged position the sleeve is able to move axially with respect to the bushing owing to the inwards elastic deformation of the flexible fingers. When the locking member is in the engaged position the flexible fingers of the bushing cannot be deformed elastically inwards so that the sleeve is locked axially with respect to the bushing.

DE 40 11 186 describes a stop for the hood of an automobile. The stop comprises a base with a left-handed inner threading which receives a threaded bushing. A pin has a rounded head which is fixed by means of a split-body screw. The screw has a right-handed threading with a tip which causes expansion of the split body so that it engages the base. This characteristic feature allows adjustment in the axial direction after the stop has been applied to the engine hood.

EP-A-611868 describes a three-part adjustable stop comprising a support, an axially adjustable stop member arranged in a cavity of the support and a rotatable locking member which can be operated so as to lock the stop member in a preferred position.

OBJECT AND SUMMARY OF THE INVENTION

The object of the present invention is to provide an improved self-adjusting spacer device with a smaller number of components compared to the devices of the prior art.

A further object of the present invention is to provide a self-adjusting spacer which may ensure water-tightness.

According to the present invention, these objects are achieved by a self-adjusting spacer device having the characteristic features forming the subject of claim 1.

The claims form an integral part of the teaching provided in connection with the invention.

BRIEF DESCRIPTION OF THE DRAWINGS

The present invention will now be described in detail with reference to the accompanying drawings provided purely by way of a non-limiting example in which:

FIG. 7 is a perspective view of a second embodiment of a self-adjusting spacer device according to the present invention;

FIG. 8 is an axial section through the device according to FIG. 7; and

FIG. 9 is a perspective view of the part indicated by the arrow IX in FIG. 8.

DETAILED DESCRIPTION

Figure 1:
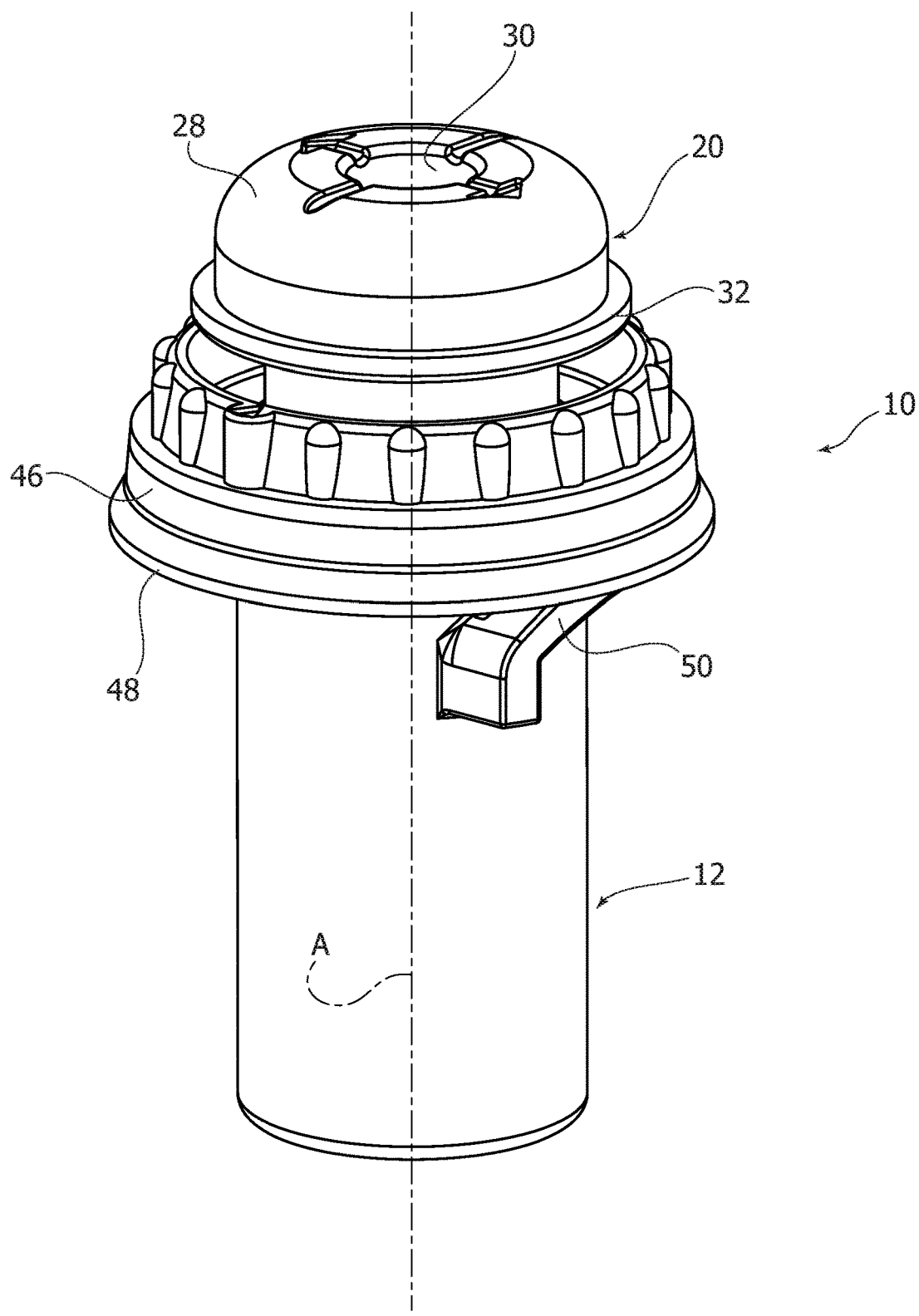
FIG. 1 is a perspective view of a self-adjusting spacer device according to a first embodiment of the present invention.
Figure 2:
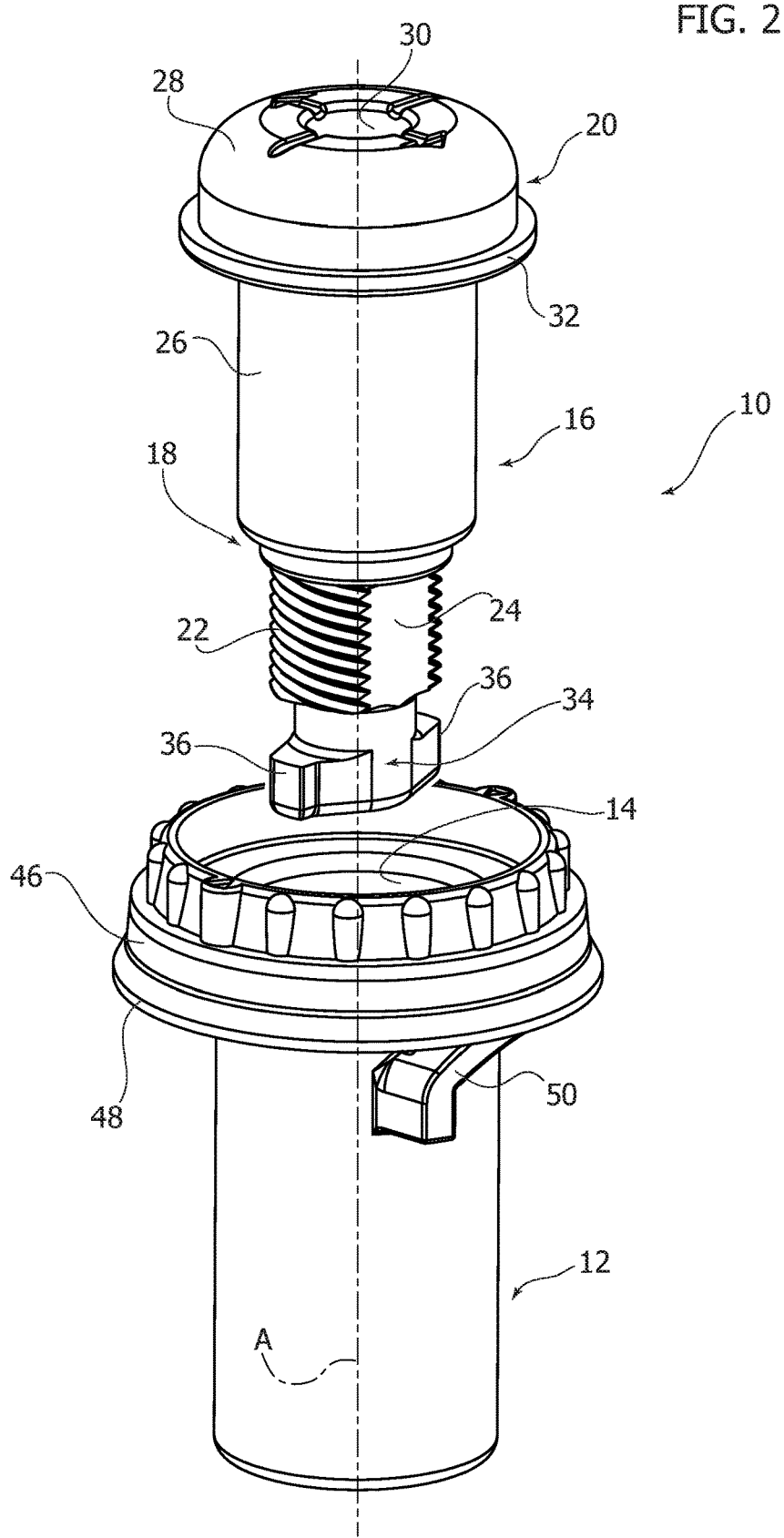
FIG. 2 is an exploded perspective view of the spacer device according to FIG. 1.

With reference to FIGS. 1 and 2, 10 denotes a self-adjusting spacer device according to the present invention. The spacer device 10 comprises a bushing 12 having a cavity 14 with a longitudinal axis A and a pin having a shank 18 and a head 20. The shank 18 of the pin 16 is inserted into the cavity 14 of the bushing 12 and the head 20 of the pin 16 projects outside of the bushing 12.

The shank 18 of the pin 16 has an integral threaded portion 22 which does not extend along the entire perimeter of the shank 18. In the example shown, the threaded portion 22 of the shank 18 is interrupted by two flat portions 24 opposite to each other. The distance between the flat portions 24 is less than the diameter of the threaded portion 22.

The pin 16 is preferably provided with a sleeve 26 of elastomeric material applied onto the shank 18. Preferably the sleeve 26 is applied onto the shank 18 by means of overmolding.

The head 20 of the pin 16 is preferably provided with a cap 28 of elastomeric material, preferably applied onto the top part of the pin 16 by means of overmolding. The head 20 is provided with a seat 30 which can be engaged by a spanner. The head 20 is preferably provided with an annular shoulder 32 on which the cap 28 rests. The sleeve 26 extends between the top end of the threaded portion 22 and the annular shoulder 32.

Below the threaded portion 22 the pin 16 is preferably provided with a retaining portion 34 provided with two radial projections 36.

With reference to FIGS. 3, 4, 5 and 6, the bushing 12 has inside the cavity 14 a threaded portion 38 which does not extend along the entire circumference. The threaded portion 38 may be formed on two opposite projections 40 which project radially inwardly from the inner wall of the cavity 14.

The cavity 14 of the bushing 12 is provided with a first pair of longitudinal grooves 42 and a second pair of longitudinal grooves 44 situated on the side wall of the cavity 14 below the threaded portion 38.

The bushing 12 is provided with an annular collar 46 which may be fitted with annular lip of elastomeric material 48, preferably applied by means of overmolding. The bushing 12 may also be provided with two integral fastening elements 50 protruding from the outer wall of the bushing 12 and located below the annular collar 46.

Figure 3:
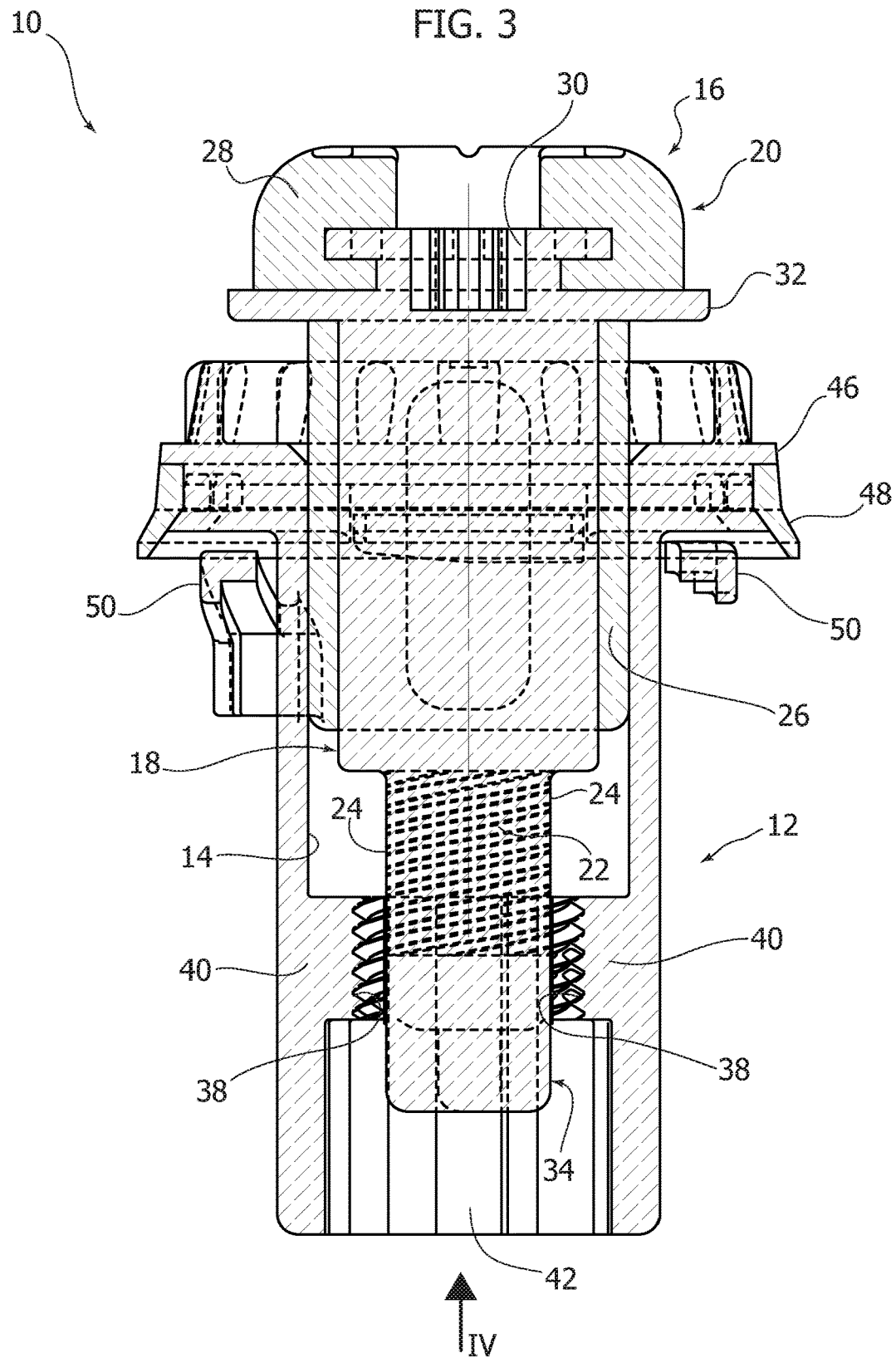
FIG. 3 is an axial section through the device according to FIG. 1 in an adjustment position.
Figure 4:
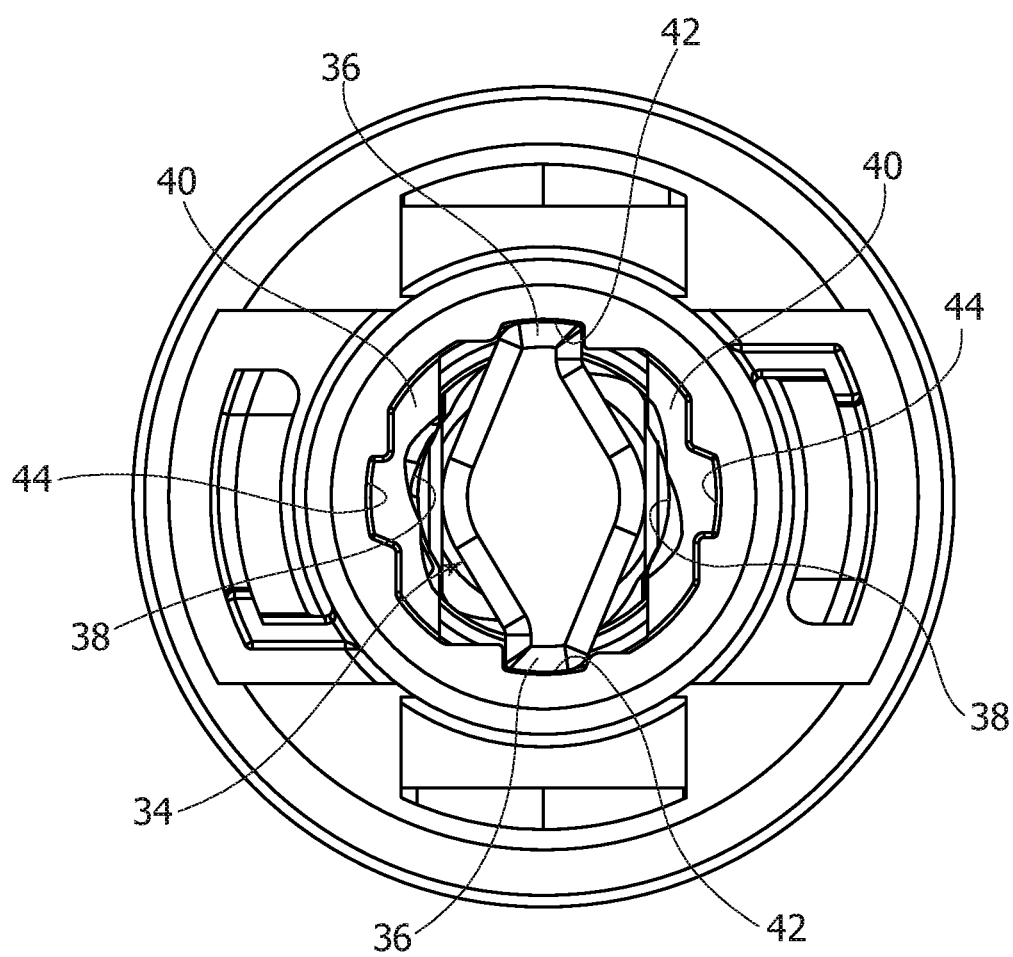
FIG. 4 is a view in the direction of the arrow IV of FIG. 3.
Figure 5:
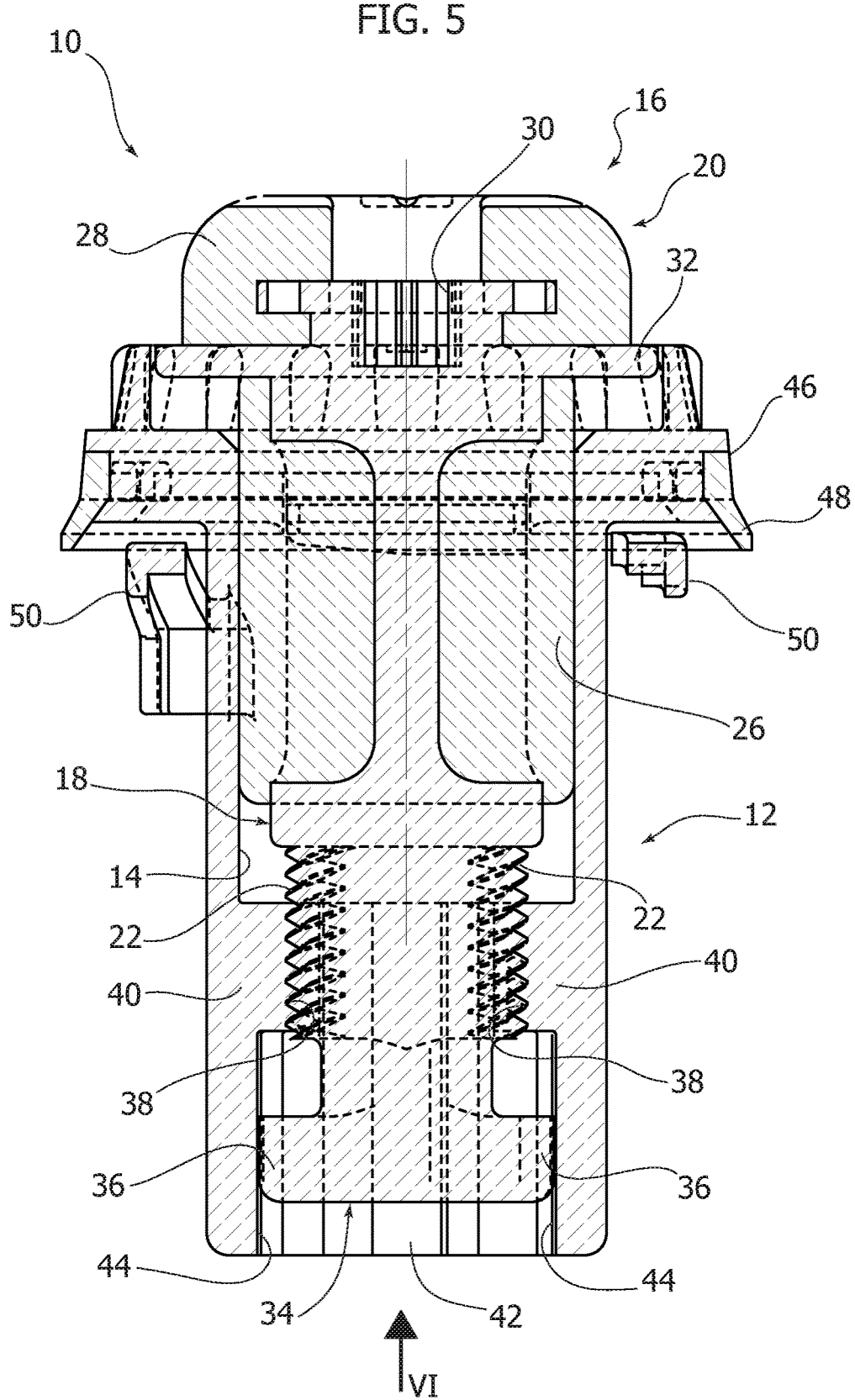
FIG. 5 is an axial section through the device according to FIG. 1 in a locking position.

The pin 16 is rotatable with respect to the bushing 12 between an adjustment position and a locking position. The two positions are angularly offset with respect to each other by 90°. In the adjustment position the threaded portion 22 of the pin 16 is angularly offset and disengaged from the threaded portion 38 of the bushing 12. In this position the radial projections 36 of the retaining portion of the pin 16 engage the first pair of longitudinal grooves 42. As can be seen in FIG. 3, in this position the flattened portions 24 of the pin 16 are facing the threaded portions 38 of the bushing 12. In this position, the pin 16 may move axially with respect to the bushing 12. The sleeve of elastomeric material 26 has an outer surface in contact with the inner wall of the cavity 14. The movement of the pin 16 in the axial direction must overcome the frictional force between the elastomeric sleeve 26 and the inner wall of the cavity 14.

The spacer device 10 is supplied with the pin 16 arranged in the adjustment position and with the pin 16 in the extracted position with respect to the bushing 12. The bushing 12 is fixed to a wall, inside a circular hole provided with two openings opposite the fastening elements 50. The bushing 12 is rotated after insertion inside the hole so as to fix the bushing 12 to the wall by means of the fastening elements 50 which engage the bottom surface of the wall. The annular lip of elastomeric material 48 of the bushing 12 is pressed against the top surface of the wall. The lip of elastomeric material 48 of the bushing 12 and the elastomeric sleeve 26 close in a liquid-tight manner the hole inside which the bushing 12 is fixed.

With the pin 16 in the adjustment position and the bushing 12 fixed inside a hole in the vehicle body, the hood or trunk door of the vehicle is brought into the closed position. The hood or trunk door of the vehicle rests on the head 20 of the pin 16 and pushes the pin 16 towards the inside of the cavity 14. The pin 16 automatically assumes the correct adjustment position.

Figure 6:
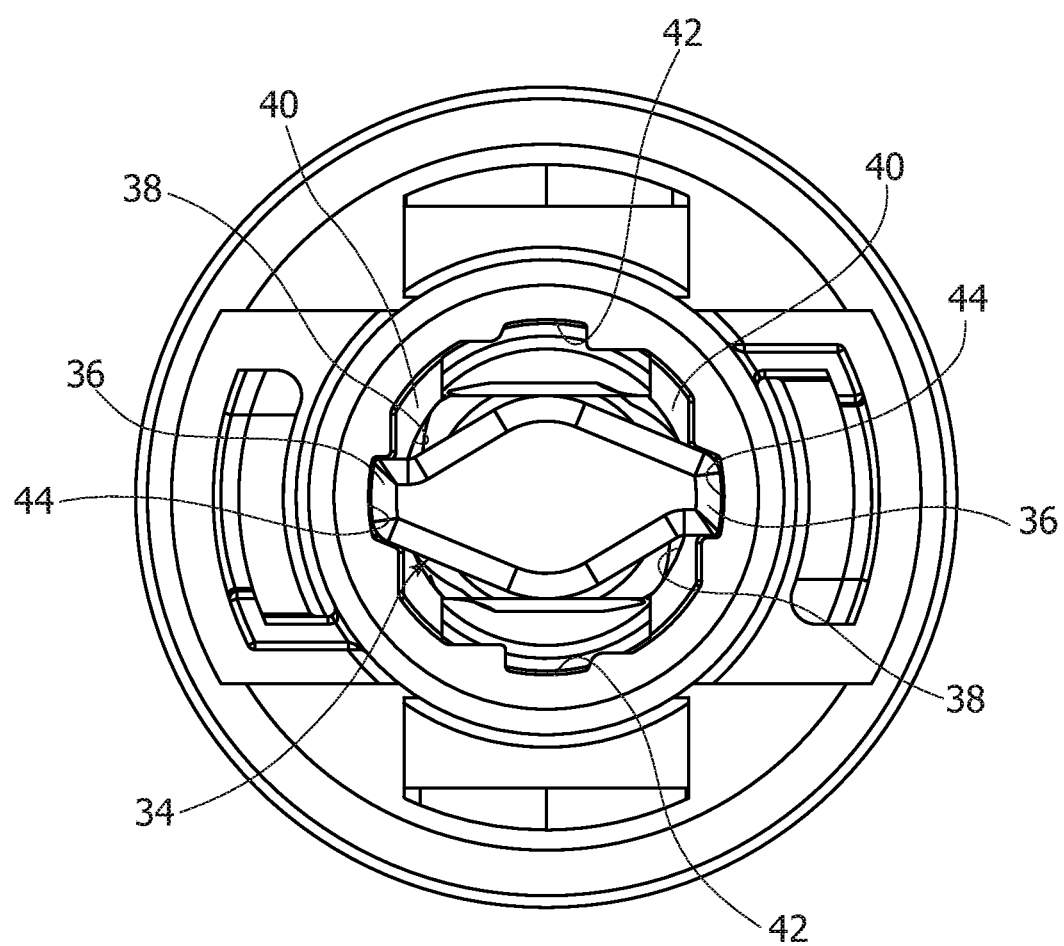
FIG. 6 is a view in the direction of the arrow VI of FIG. 5.

Then, the hood or trunk door is raised. The pin 16 remains in the set adjustment position owing to the friction between the elastomeric sleeve 26 and the inner wall of the cavity 14. Then, the pin 16 is rotated through 90° into the locking position. For rotation of the pin 16 a spanner which engages the seat 30 provided on the head 20 of the pin 16 may be used. During rotation of the pin 16 between the adjustment position and the locking position, the threaded portion 22 of the pin 16 engages with the threaded portion 38 of the bushing 12. The rotation through 90° of the pin from the adjustment position into the locking position, following engagement between the threads 22 and 38, produces an axial travel of the pin 16 equal to a quarter of the pitch of the threads. In this way, when the hood or trunk door of the vehicle is closed it must compress slightly the elastomeric portion 28 formed on the head 20 of the pin 16 and this produces a slight pretension effect which prevents vibrations of the hood or trunk door in the closed position. In the locking position the pin 16 is locked angularly owing to the engagement between the radial projections 36 of the engaging portion 34 with the second pair of grooves 44, as shown in FIG. 6.

The spacer device 10 ensures the liquid-tightness owing to the fact that the pin 18 is a solid one-piece element which makes liquid-tight contact with the bush 12 owing to the elastomeric sleeve 26. Moreover, the bushing is connected to the vehicle body in a liquid-tight manner owing to the annular lip of elastomeric material 48.

The spacer device according to the present invention may be subject to numerous constructional variants. One of these variants is shown in FIGS. 7 to 9. In the variant according to FIGS. 7 to 9 the parts corresponding to those described above are indicated by the same reference numbers. In this second embodiment, the bushing 12 is provided with an outer tubular portion 52 and an inner tubular portion 54. The inner tubular portion 54 is provided with a threaded portion 38 as in the example described above. The pin 16 has a sleeve 26 in sealing contact with the inner surface of the outer tubular portion 52. An annular lip 48 of elastomeric material is applied, for example by means of overmolding, to the bottom end of the outer tubular portion 52.

In this second embodiment, the angular retaining action keeping the pin 16 in the adjustment position and in the locking position is provided by two projecting ribs 56 situated between the threaded portion 22 of the pin 16 and the sleeve 26. The ribs 56 of the pin 16 engage corresponding grooves formed on the inner surface of the inner tubular portion 54. The liquid-tightness between the pin 16 and the bushing 12 could be obtained by means of a sealing ring (O-ring) 58 inserted inside an annular seat of the sleeve 26 of the pin 16. The sealing ring 58 makes sealing contact against the inner surface of the outer tubular portion 52.

The operating principle of the spacer device shown in FIGS. 7, 8 and 9 is identical to that described above.

Obviously, without altering the principle of the invention, the constructional details and embodiments may be greatly varied with respect to that described and illustrated, without thereby departing from the scope of the invention as defined in the following claims.

The invention claimed is:

1. A self-adjusting spacer device, comprising:
   a bushing having a cavity with a longitudinal axis; and
   a pin having a shank inserted into said cavity and a head projecting outside of said cavity,
   wherein the cavity of the bushing and the pin are provided with respective threaded portions that do not extend over the entire circumference of the pin and the cavity, and the pin is rotatable relative to the bushing between:
      an adjustment position in which the threaded portion of the pin is disengaged from the threaded portion of the bushing and the pin is movable axially with respect to the bushing, and
      a locking position in which the threaded portion of the pin engages the threaded portion of the bushing and the pin is locked axially with respect to the bushing, and
   wherein the pin comprises a sealing element which establishes a sealing contact with the inner surface of said cavity, and
   wherein the sealing element is a sleeve of elastomeric material overmolded on the shank of the pin.

2. The device as claimed in claim 1, wherein the threaded portion of the pin comprises two non-threaded flat portions opposite to each other and spaced apart by a distance less than the diameter of the threaded portion.

3. The device as claimed in claim 1, wherein said threaded portion of the bushing is formed on two radial projections extending inwardly from the inner surface of said cavity.

4. The device as claimed in claim 1, wherein the pin is provided with radial projections which engage a first and a second pair of axial grooves formed on the inner surface of said cavity respectively in the adjustment position and in the locking position.

5. The device as claimed in claim 1,
wherein said bushing has an annular collar fitted with an annular sealing lip.

6. The device as claimed in claim 5, wherein said bushing is provided with integral fastening elements protruding from the outer surface of said bushing and located below said collar.

7. A self-adjusting spacer device, comprising:
a bushing having a cavity with a longitudinal axis; and
a pin having a shank inserted into said cavity and a head projecting outside of said cavity,
wherein the cavity of the bushing and the pin are provided with respective threaded portions that do not extend over the entire circumference of the pin and the cavity, and the pin is rotatable relative to the bushing between:
an adjustment position in which the threaded portion of the pin is disengaged from the threaded portion of the bushing and the pin is movable axially with respect to the bushing, and
a locking position in which the threaded portion of the pin engages the threaded portion of the bushing and the pin is locked axially with respect to the bushing,
wherein the pin includes a seal, and
wherein the seal establishes a sealing contact with the inner surface of said cavity, wherein the seal is a sleeve.

8. The device as claimed in claim 7, wherein the seal establishes a liquid-tightness between the pin and the bushing.

* * * * *